United States Patent [19]
Hamanaka et al.

[11] Patent Number: 6,034,828
[45] Date of Patent: Mar. 7, 2000

[54] RECORDING OF REPRODUCING APPARATUS

[75] Inventors: Akiyoshi Hamanaka, Tokyo; Toshiya Yatomi, Kanagawa-ken; Takayuki Kikuchi; Izumi Matsui, both of Tokyo, all of Japan

[73] Assignee: Canon Kabushiki Kaisha, Tokyo, Japan

[21] Appl. No.: 08/922,804

[22] Filed: Sep. 3, 1997

Related U.S. Application Data

[63] Continuation of application No. 08/417,397, Apr. 15, 1995, abandoned.

[30] Foreign Application Priority Data

Apr. 11, 1994 [JP] Japan .................................. 6-072028
May 19, 1994 [JP] Japan .................................. 6-105470
May 19, 1994 [JP] Japan .................................. 6-105471

[51] Int. Cl.$^7$ .......................................................... G11B 5/86
[52] U.S. Cl. .......................... 360/15; 360/132; 360/73.04; 360/53; 369/84; 386/47

[58] Field of Search .............................. 360/38.1, 31, 27, 360/132, 69, 71, 73.04, 53, 15; 358/314, 336; 369/14, 15, 48, 58, 84, 85; 386/2, 47

[56] References Cited

U.S. PATENT DOCUMENTS

| | | | |
|---|---|---|---|
| 4,277,807 | 7/1981 | Baldwin | 360/38.1 |
| 4,338,644 | 7/1982 | Staar | 360/69 |
| 4,686,563 | 8/1987 | Fountain | 360/38.1 |
| 4,960,982 | 10/1990 | Takahira | 369/14 |
| 5,105,282 | 4/1992 | Taguchi | 358/336 |
| 5,434,721 | 7/1995 | Sawada | 360/132 |

*Primary Examiner*—Paul W. Huber
*Assistant Examiner*—Alan Paul Faber
*Attorney, Agent, or Firm*—Robin, Blecker & Daley

[57] ABSTRACT

A recording and reproducing apparatus reproduces a digital information signal and a control signal from a memory device, which is integrally formed of different kinds of memories and, according to the reproduced control signal, controls an operation of reproducing the digital information signal to automatically control the operation of the apparatus.

17 Claims, 19 Drawing Sheets

F I G. 9

| | | | | | | | |
|---|---|---|---|---|---|---|---|
| THICKNESS OF TAPE | REPRODUCE (t1~t2) | DECODE AND WRITE INTO MEMORY 111 | F F (→t3) | READ OUT FROM MEMORY 111 → OUTPUT TO MONITOR | REPRODUCE (t3~t4) | DECODE AND WRITE INTO MEMORY 111 | RWD |
| KIND OF TAPE | | | | | | | |
| GRADE OF TAPE | | | | | | | |
| CASSETTE ID | | | | | | | |
| LENGTH OF TAPE | | | | | | | |
| RECORDING TIME | | | | | | | |

AREA "0"   AREA "1"

FIG. 13

| AREA "0" | AREA "1" |
|---|---|
| THICKNESS OF TAPE | REPRODUCE : TRACK No. |
| KIND OF TAPE | TRANSPORT TAPE |
| GRADE OF TAPE | TRANSFER TO MEMORY 118 |
| CASSETTE ID | TRANSFER PRINT INFORMATION TO PRINTER |
| LENGTH OF TAPE | START PRINTING |
| | END PRINTING |
| RECORDING TIME | RWD |

FIG. 15

| | ID OF HARDWARE | CONTROL COMMANDS (INFORMATION) |
|---|---|---|
| THICKNESS OF TAPE | | |
| KIND OF TAPE | VTR M | DUBBING TITLE-1 (START & END TIME_CODE) |
| GRADE OF TAPE | VTR M | START SEARCH (START) |
| CASSETTE ID | VTR S | STANDBY FOR RECORDING |
| | VTR M | NORMAL REPRODUCTION UPON COMPLETION OF STANDBY OF VTR S |
| LENGTH OF TAPE | VTR S | START RECORDING (CANCEL STANDBY) |
| | VTR M | STOP ON ARRIVAL AT END POINT OF TITLE-1 (E/E) |
| RECORDING TIME | VTR S | STOP (E/E) |
| | | |

SPACE "0"　　　　　　　　　　　　　　　　　　　　　SPACE "1"

VTR M : MASTER VTR
VTR S : SLAVE VTR

FIG. 17

| | SPACE "0" | | SPACE "1" |
|---|---|---|---|
| THICKNESS OF TAPE | VTR M | | SEARCH ADDRESS-1 |
| KIND OF TAPE | VTR M | | START SEARCH (ADDRESS-1) |
| GRADE OF TAPE | VTR S | | STANDBY FOR RECORDING |
| CASSETTE ID | VTR M | | NORMAL REPRODUCTION UPON COMPLETION OF STANDBY OF VTR S |
| | VTR S | | START RECORDING (CANCEL STANDBY) |
| LENGTH OF TAPE | VTR M | | STANDBY FOR REPRODUCTION ON ARRIVAL AT END POINT OF TITLE-1 |
| | VTR S | | STANDBY FOR RECORDING |
| | VTR M | | SEARCH ADDRESS-2 |
| | VTR M | | START SEARCH (ADDRESS-2) |
| | VTR M | | START RECORDING (CANCEL STANDBY) |
| RECORDING TIME | VTR S | | ORDINARY REPRODUCTION (CANCEL STANDBY) |
| | VTR M | | STOP REPRODUCTION ON ARRIVAL AT END POINT OF TITLE-1 (E/E) |
| | VTR S | | STOP RECORDING (E/E) |

FIG.18

| SPACE "0" | SPACE "1" | | | | | | |
|---|---|---|---|---|---|---|---|
| THICKNESS OF TAPE | REMAINING AMOUNT OF TAPE (65 MINUTES) | | | | | | |
| KIND OF TAPE | EDITING RECORDING (MASTER ID, SLAVE ID) | | | | | | |
| GRADE OF TAPE | TITLE-1 (NAME) | | | | | | |
| CASSETTE ID | TITLE-2 (NAME) | | | | | | |
| LENGTH OF TAPE | | | | | | | |
| RECORDING TIME | | | | | | | |

FIG.20

| AREA "0" | AREA "1" |
|---|---|
| THICKNESS OF TAPE | CONTROL PRINTER A |
| KIND OF TAPE | CONTROL PRINTER A |
| GRADE OF TAPE | CONTROL VTR |
| CASSETTE ID | CONTROL DISPLAY |
| LENGTH OF TAPE | CONTROL FACSIMILE |
| RECORDING TIME | |

RECORDING OF REPRODUCING APPARATUS

This is a continuation application under 37 CFR 1.62 of prior application Ser. No. 08/417,397, filed Apr. 5, 1995, now abandoned.

FIELD OF THE INVENTION

The present invention relates to a recording or reproducing apparatus and more particularly to an apparatus for recording or reproducing digital information signals.

DESCRIPTION OF THE RELATED ART

A digital VTR of this kind has been known which digitizes moving image signals such as video signals and records the digital moving image signals in magnetic tapes. Some of the recently developed magnetic tape cassettes are provided with a semiconductor memory (hereinafter referred to simply as a memory) in addition to the magnetic tape. Possible contents of information to be stored in the semiconductor memory include the thickness and kind of magnetic tape and titles of recorded items. The memory capacity may be expanded as the technology advances in the future.

This kind of recording and reproducing apparatus has a problem of dropouts that occur when a recorded signal is reproduced. In such a digital VTR, because the image signals and audio signals are recorded as digital signals, it is very difficult to compensate for the dropout as in the analog VTR.

In operating this kind of VTR, an operator directs the recording and reproducing operations. In editing, such as dubbing, the operator must control two VTRs, a master and a slave, and the manipulation is very troublesome.

Even for video cassettes used as a source for an event, whose operation procedure is already determined, the operator is required to control the VTR.

When a video printer is connected to the VTR to print an image, it is necessary to control the VTR to access the tape position where a desired image to be printed is recorded, and its operation is very complex.

SUMMARY OF THE INVENTION

The present invention is intended to solve the above-mentioned problems.

Another object of this invention is to provide an apparatus capable of automatic control of its operation.

To achieve the above objectives, this invention proposes a reproducing apparatus, which comprises: reproducing means for reproducing a digital information signal and a control signal from a memory device integrally formed of different kinds of memory means; and control means for controlling an operation of the reproducing apparatus according to the control signal reproduced by the reproducing means.

A further object of this invention is to provide a recording and reproducing apparatus which makes full use of the memory capability and which can prevent quality degradation of reproduced images even in the event of dropout.

To achieve the above objective, this invention proposes a recording and reproducing apparatus which comprises: reproducing means for reproducing a digital image signal from a specified memory means of a memory device which is integrally formed of different kinds of memory means; detection means for detecting a digital image signal that cannot be reproduced by the reproducing means; identification signal generating means for generating an identification signal for identifying the unreproducible digital image signal according to an output of the detection means; and recording means for recording a signal onto the memory device; wherein the recording means records the identification signal onto memory means of the memory device other than the specified memory means.

Other objects and features of this invention will become apparent from the following detailed description of embodiments with reference to the accompanying drawings.

BRIEF DESCRIPTION OF THE DRAWINGS

FIG. 9 is a list of contents of data stored in memory in the fourth embodiment;

FIG. 13 is a list of contents of data stored in memory in the fifth embodiment;

FIG. 15 is a list of contents of data stored in memory in the sixth embodiment;

FIG. 17 is a list of contents of a control signal stored in memory in a seventh embodiment;

FIG. 18 is a list of contents of data stored in memory in the seventh embodiment;

FIG. 20 is a list of contents of further data stored in memory in the seventh embodiment.

DETAILED DESCRIPTION OF THE PREFERRED EMBODIMENT

Figure 1:
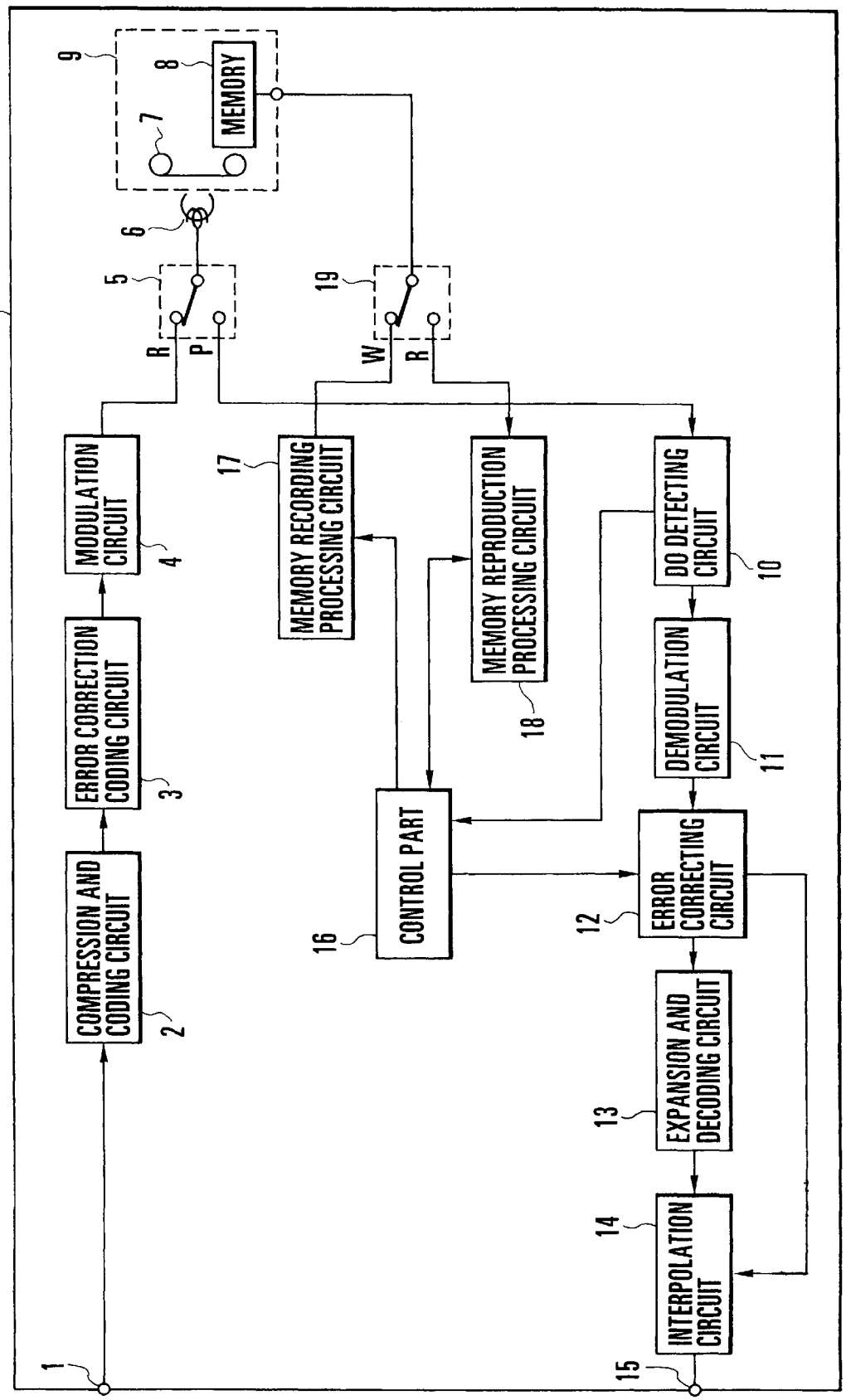
FIG. 1 is a block diagram showing the configuration of a digital VTR as a first embodiment of this invention.

Now, embodiments of this invention will be described in detail by referring to the accompanying drawings. FIG. 1 is a block diagram showing the configuration of a digital VTR as the first embodiment of this invention. By referring to FIG. 1, an example case of recording image signals in the magnetic tape is explained.

In FIG. 1, a digital image signal such as a video signal is supplied from an input terminal 1 of a VTR V and compressed into the amount of information which is compatible with the recording format by a compression and coding circuit 2. The compression and coding circuit 2 compresses the digital image signal in terms of information volume by known techniques such as discrete cosine transformation (DCT) and variable length coding and encodes the compressed image signal. The image signal compressed and coded by the compression and coding circuit 2 is fed into an error correction coding circuit 3 where it is subjected to an error correction coding processing, after which the image signal undergoes modulation by a modulation circuit 4 suited for magnetic recording. The modulated image signal is then sent through an R terminal of a switch 5 to a magnetic head 6 that records the signal on a magnetic tape 7 in a cassette 9.

Next, how dropout information during the reproduction of image signals recorded in the magnetic tape 7 is recorded is described. In a reproducing operation, the image signal reproduced by the magnetic head 6 from the magnetic tape 7 is output through a P terminal of the switch 5 to a dropout (DO) detecting circuit 10. In the following, the DO detection operation performed by the DO detecting circuit 10 is explained.

Figure 2:
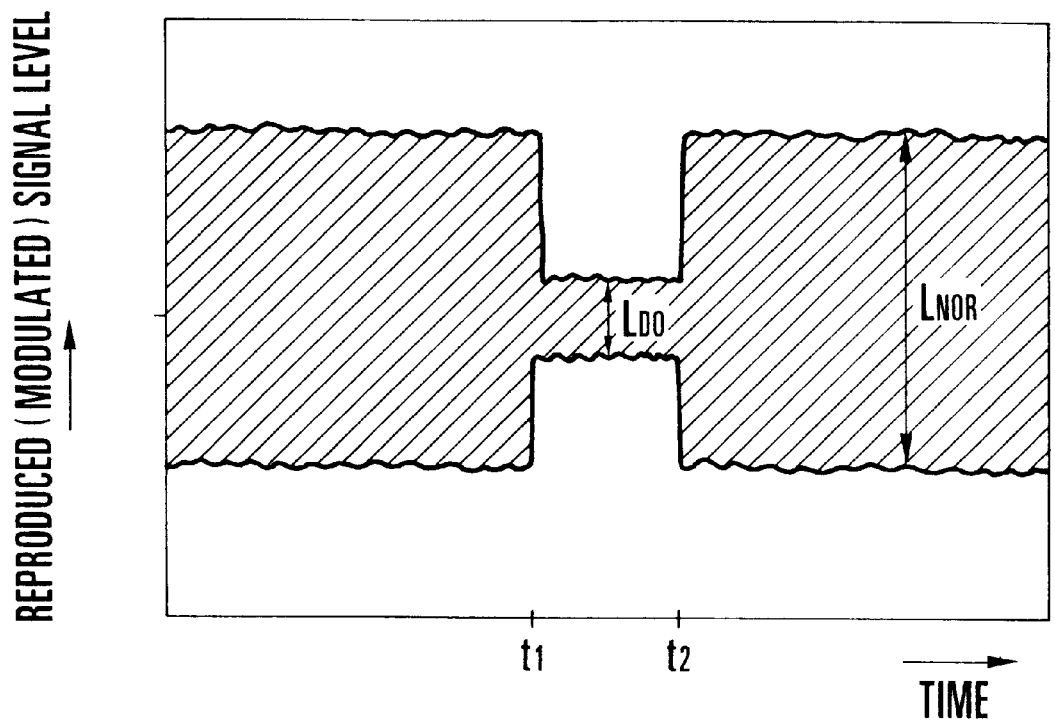
FIG. 2 is a graph showing the operation of a DO detecting circuit of FIG. 1.
Figure 3:
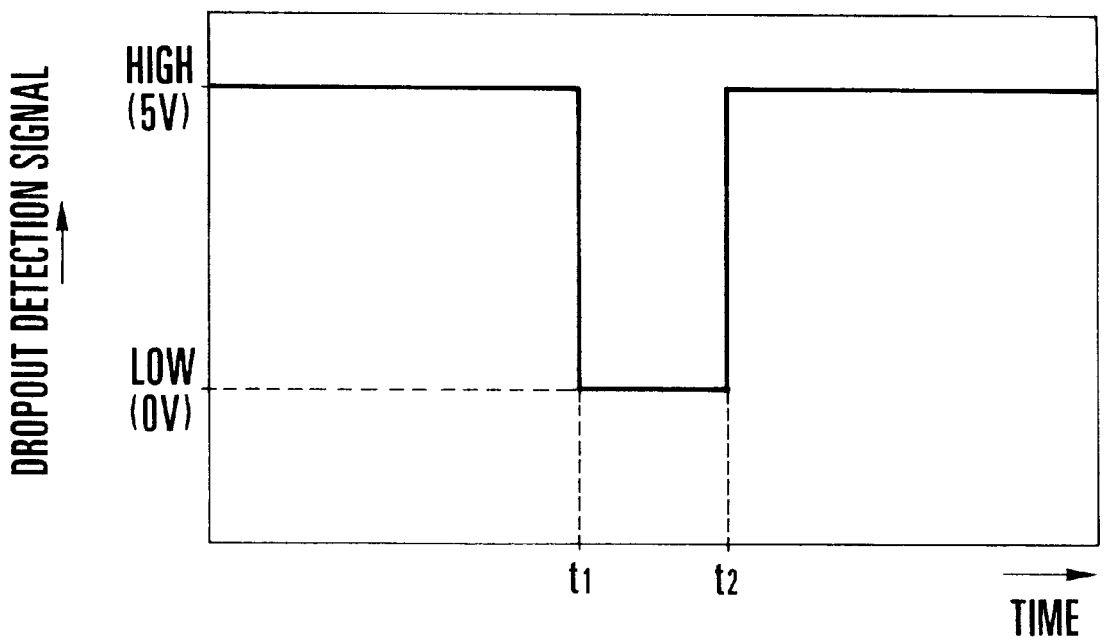
FIG. 3 is a graph showing information on a dropout position.

FIG. 2 is a graph showing a reproduced image signal from the switch 5, and FIG. 3 shows a DO detection signal output from the DO detecting circuit 10.

The DO detecting circuit 10, as shown in FIG. 2, detects the envelope of the reproduced image signal and its level. If the level of envelope of the reproduced image signal is smaller than a predetermined level, the DO detecting circuit 10 decides that a DO (dropout) has occurred. Now, if a DO is found in the reproduced image signal at time t1 and ended at time t2, the DO detecting circuit 10 outputs a DO detection signal of FIG. 3 representing the occurrence of the DO to a control part 16. The DO detection signal is low while the DO is present and becomes high at other times.

Upon reception of the DO detection signal, the control part 16 controls a memory recording processing circuit 17 based on a time code recorded together with the reproduced image signal, and generates DO position information that provides a time code representing the time t1 of a rising edge of the DO detection signal and the time t2 of a falling edge. The memory recording processing circuit 17 stores the generated DO position information in a memory 8 such as a semiconductor memory in the cassette 9 via a W terminal of a switch 19.

Next, a process of reproducing an image signal based on the DO position information recorded in the memory 8 is explained.

An image signal reproduced by the magnetic head 6 from the magnetic tape 7 is output through the P terminal of the switch 5 and the DO detecting circuit 10 to a demodulation circuit 11, which demodulates and then outputs the demodulated signal to an error correcting circuit 12.

At the same time that the image signal is reproduced, information recorded in the memory 8 is output through the R terminal of the switch 19 to a memory reproduction processing circuit 18. The memory reproduction processing circuit 18 detects the DO position information from the memory 8 and outputs the time when the DO occurred and the time that it ended to the control part 16. The control part 16 compares the time code contained in the reproduced image signal with the DO occurrence time t1 input from the memory reproduction processing circuit 18, and then controls the error correcting circuit 12 when deciding that the image signal of a position corresponding to the time t1 has been input to the error correcting circuit 12.

Generally, the error correction performance is improved if positions where errors appear to have occurred are known beforehand. For this reason, the control part 16 outputs the DO positions in the reproduced image signal (positions where the probability of code error is high) to the error correcting circuit 12. This can enhance the correction capability of the error correcting circuit 12.

The error correcting circuit 12 corrects error codes in the image signal demodulated by the demodulation circuit 11 and, for errors that cannot be corrected, generates error flags. The image signal whose error codes have been corrected by the error correcting circuit 12 is sent to an expansion and decoding circuit 13 where it is subjected to an expansion and decoding processing that corresponds to the processing of the compression and coding circuit 2. The expanded and decoded image signal is then output to an interpolation circuit 14, which generates an interpolating image signal for a block containing the uncorrectable image signals according to the error flag from the error correcting circuit 12 and performs interpolation on the block of signals. The image signal processed by the interpolation circuit 14 is output to the outside from an output terminal 15.

As explained above, in this embodiment, the DO position information is stored in the memory 8 in the cassette 9 and, during the reproduction operation, the DO occurrence position can be identified from the DO position information, so that it is possible to improve the error correction capability by notifying the error correcting circuit 12 of the DO position information and the DO signal input timing.

Although the DO occurrence position in the magnetic tape 7 can be confirmed by reproducing the time code because the above embodiment concerns a case where this invention is applied to the digital VTR, it is also possible to use a track number for checking the DO occurrence position. That is, in the digital VTR, the track number formed in a tape is recorded at each track as an absolute number from the start of the tape. Other means may be used as long as they can identify the absolute position in the recording medium.

Figure 4:
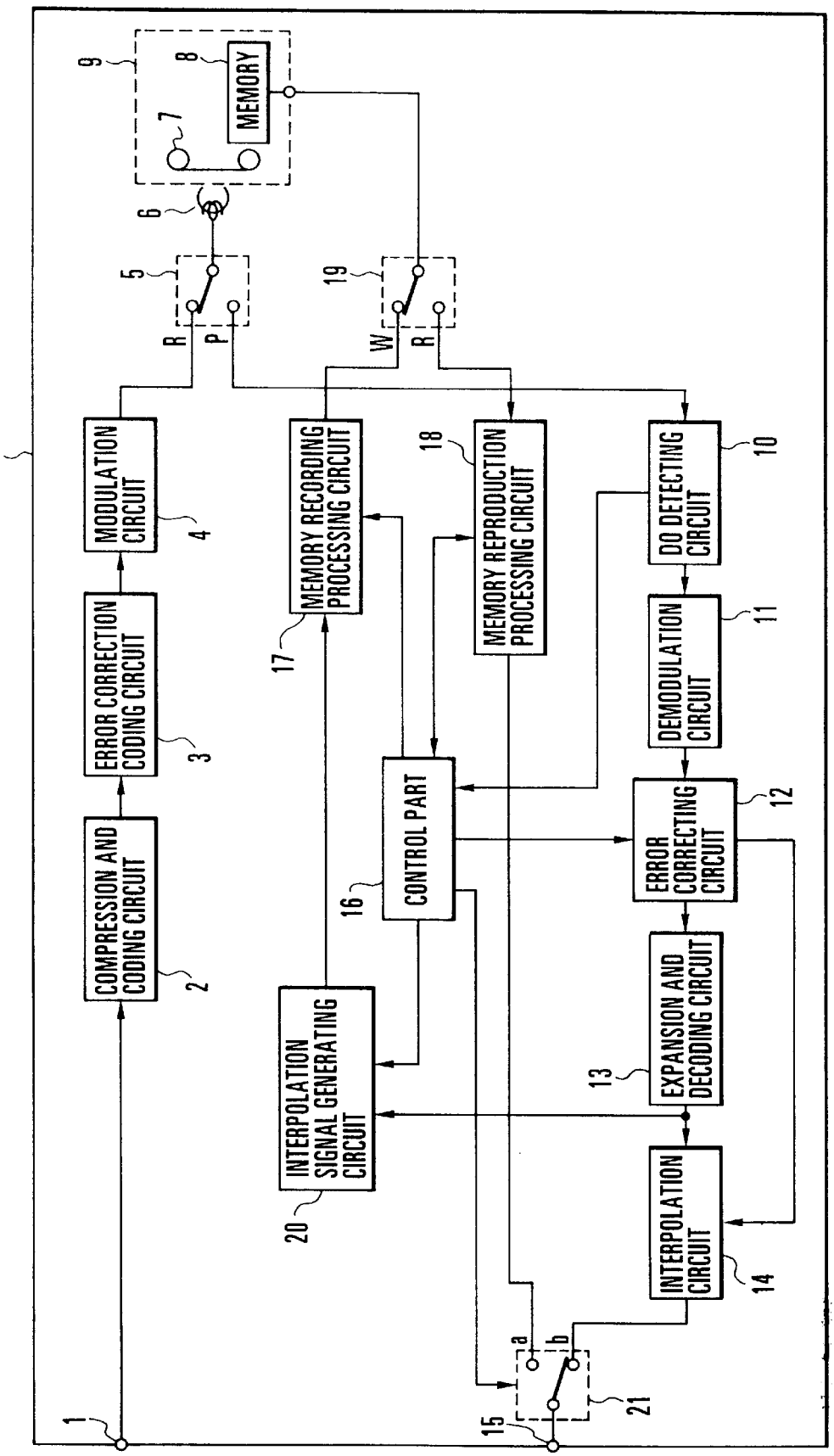
FIG. 4 is a block diagram showing the configuration of a digital VTR as a second embodiment of this invention.

Next, a second embodiment of this invention will be described. FIG. 4 is a block diagram showing the configuration of a digital VTR as the second embodiment of this invention. Components identical with those of the first embodiment are given like reference numerals and their detailed descriptions are omitted.

In this embodiment, when a DO occurs, an interpolation image for the DO image, as well as the DO position information, is recorded in the memory 8. The process of recording DO position information and an interpolation image is explained below.

When an image signal is reproduced from the magnetic tape 7, the DO detecting circuit 10 detects a DO in the reproduced image signal, as mentioned above, and outputs the DO detection signal to the control part 16. Upon reception of the DO detection signal, the control part 16 controls the memory recording processing circuit 17 to generate DO position information. Further, the control part 16, when it receives the DO detection signal, outputs a control signal to an interpolation signal generating circuit 20. The interpolation signal generating circuit 20, based on the control signal received, generates an interpolating image signal for a DO image associated with the DO signal by using image signals around the DO image, and then outputs the interpolating image signal to the memory recording processing circuit 17. The memory recording processing circuit 17 records the DO position information and the interpolating image signal in the memory 8.

Figure 5:
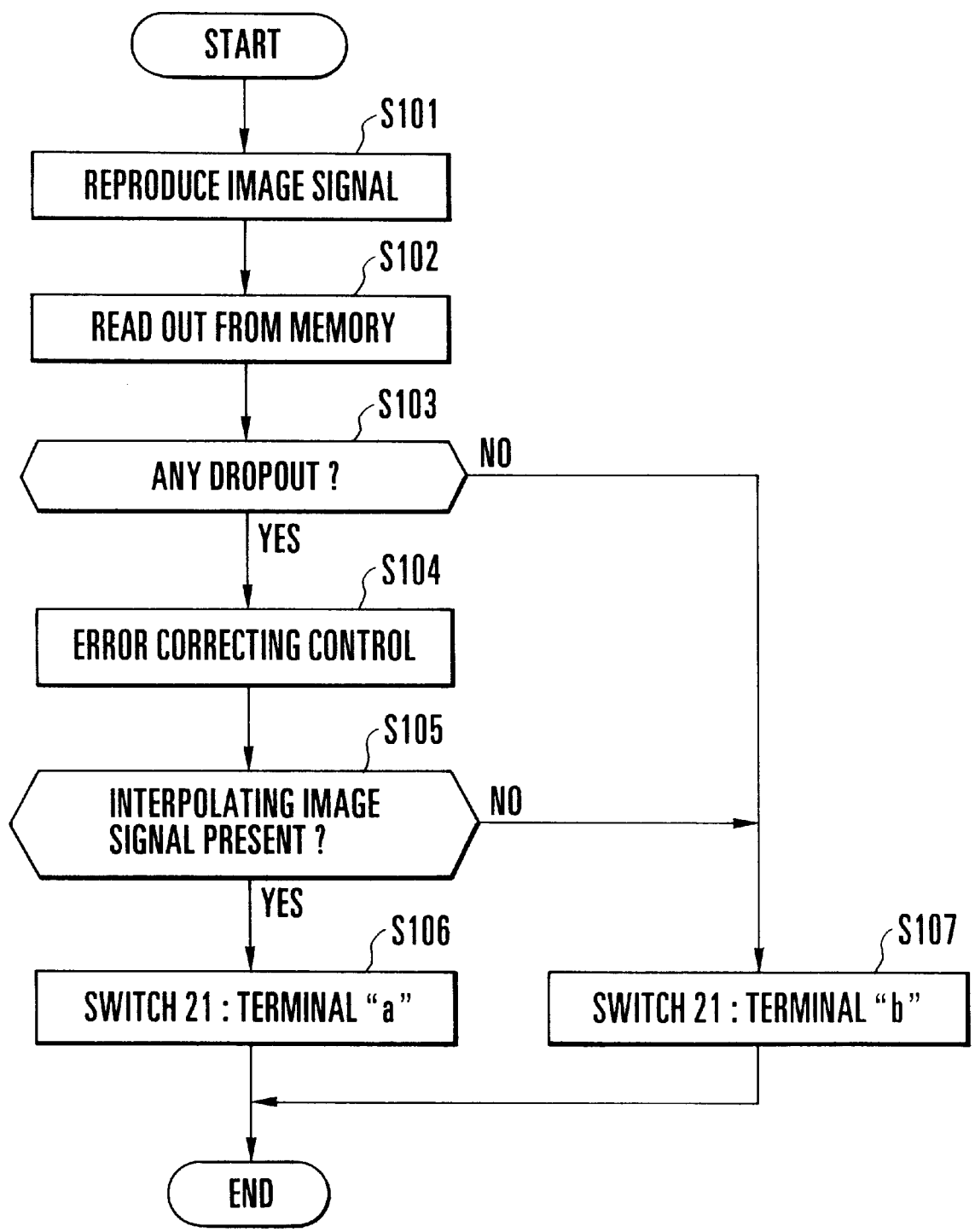
FIG. 5 is a flow chart showing the sequence of operations performed by the apparatus of FIG. 4.

Next, the process of a reproducing operation with the DO position information and the interpolating image signal stored in the memory 8 is explained by referring to the flow chart of FIG. 5.

First, an image signal is reproduced by the magnetic head 6 from the magnetic tape 7 and output to the error correcting circuit 12 through the P terminal of the switch 5 and the DO detecting circuit 10 (step S101). At the same time, the information stored in the memory 8 is read out and output to the memory reproduction processing circuit 18 (step S102). Then, the memory reproduction processing circuit 18, based on the information reproduced from the memory 8, checks whether a DO exists in the reproduced image signal (step S103).

When a DO is detected in the reproduced image signal, the control part 16 informs the error correcting circuit 12 of the position of the DO signal (step S104). Further, the memory reproduction processing circuit 18 checks if an interpolating image signal is also recorded in the memory 8 (step S105). When an interpolating image signal is found in the memory 8, the control part 16 connects a switch 21 to terminal "a" to output the interpolating image signal for the DO image from the memory reproduction processing circuit 18.

When no DO position information is found in the memory 8 at step S103, the control part 16 connects the switch 21 to terminal "b" to perform ordinary error correction, expansion and decoding, and interpolation on the reproduced image signal and output the processed signal from the output terminal 15.

Also when the step S105 finds that the interpolating image signal is not stored in the memory 8, the control part 16 connects the switch 21 to the terminal "b," causes the interpolation circuit 14 to interpolate the image signal whose errors cannot be corrected by the error correcting circuit 12 and outputs the interpolated image signal from the output terminal 15.

As explained above, because in this embodiment an interpolating image signal for a DO signal as well as the DO signal position information is recorded in the memory 8, the DO signal can be interpolated by using the interpolating image signal stored in the memory even when the image signals around the DO signal cannot be error-corrected by the error correcting circuit 12 and the interpolation by the interpolation circuit 14 using highly correlated signals cannot be performed. Hence, it is possible to perform interpolation using highly correlated signals, thereby preventing quality degradation of the reproduced image.

Figure 6:
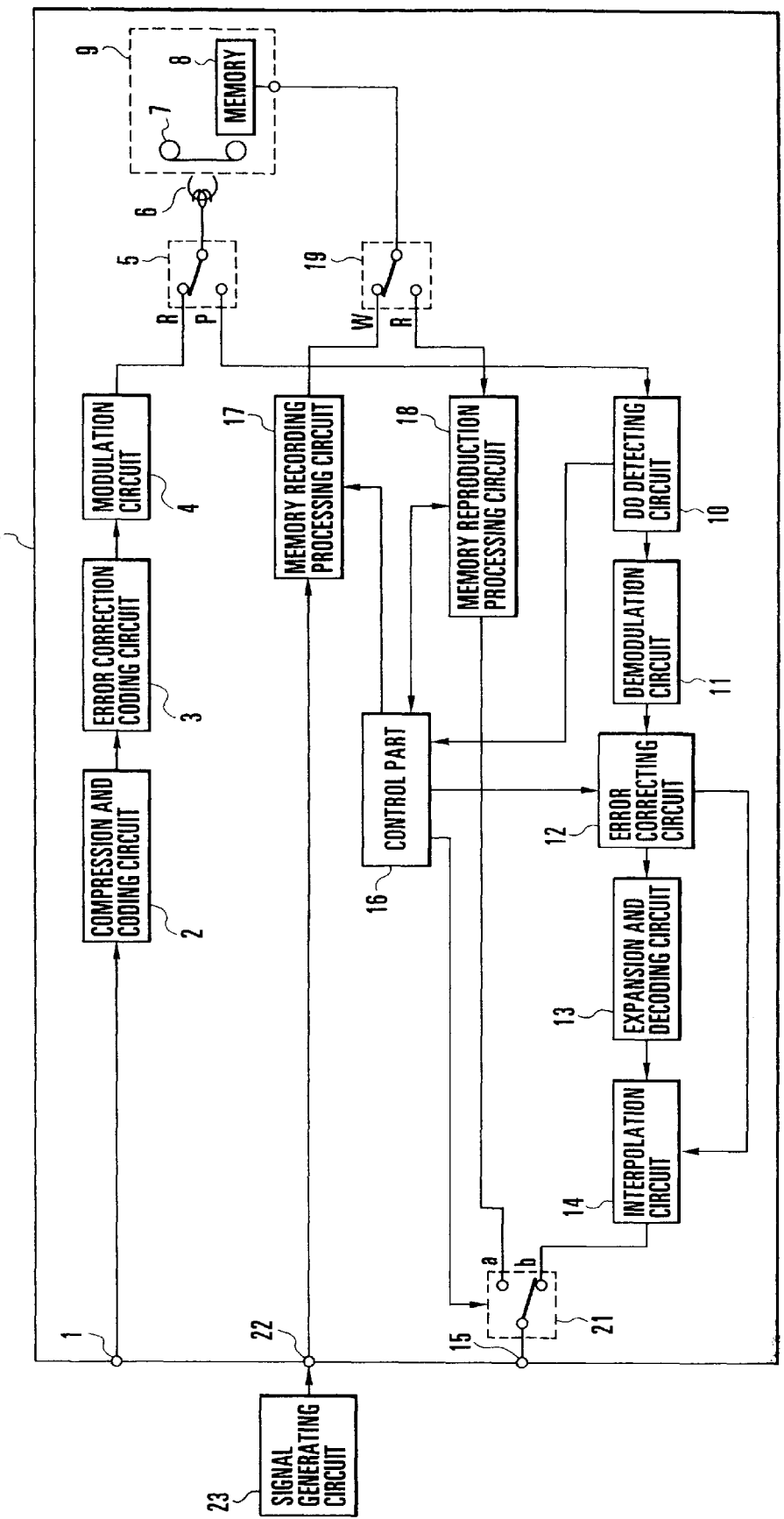
FIG. 6 is a block diagram showing the configuration of a digital VTR as a third embodiment of this invention.

Next, a third embodiment of this invention will be described. FIG. 6 is a block diagram showing the configuration of a digital VTR as the third embodiment of this invention.

When recording the DO position information, this embodiment records an interpolating signal for a DO signal, which is generated at the outside, along with the DO position information. That is, when the DO detecting circuit 10 detects a DO signal in the reproduced image signal, an external signal generating circuit 23 generates an appropriate interpolating signal for the DO signal and transfers it to the memory recording processing circuit 17 through an input terminal 22. The memory recording processing circuit 17 stores this externally generated interpolating signal along with the DO position information in the memory 8.

The reproduction operation, when the DO position information and the externally generated interpolating signal are recorded in the memory 8, is similar to that of the second embodiment.

Because the DO position information and the interpolating signal in this embodiment, too, are recorded in the memory 8, the interpolation can be done by using highly correlated signals. This is particularly advantageous when the tape is scored after recording and cannot be used for reproduction or when a special reproduction such as search is performed.

While, in this embodiment, an interpolation signal is generated and output by the signal generating circuit 23, it is also possible to produce a predetermined level of signal at all times, such as black or white level, rather than producing an interpolated signal, in order to simplify the configuration.

Further, in this embodiment, the signal generating circuit 23 produces an interpolating signal for the DO signal and outputs it to the memory recording processing circuit 17 through the input terminal 22. It is also possible to supply a variety of image signals from the input terminal 22 to record a desired image in the memory 8 and to insert the desired image at a particular position of the reproduced image during reproduction. In this way, memory can be effectively utilized.

In the preceding embodiments, description concerns a case where the recording and reproduction are performed on a cassette having a magnetic tape and one semiconductor memory. More than one semiconductor memory may be integrally incorporated into the tape cassette for similar results.

While in the preceding embodiments the magnetic tape and the semiconductor memory are integrally incorporated into the cassette, other constructions may be employed as long as the image signal is recorded to and reproduced from a memory means which consists of a plurality of different kinds of memories.

In the above embodiments, once a DO is detected, the DO detection signal and the interpolating signal are stored and remain in the memory thereafter. If the DO is due to other causes than defects in the tape, it may not appear in other reproduction operations. In such a case, interpolation may not be preferable.

Therefore, when the control part 16 compares the DO position, which is detected each time the image signal is reproduced from the magnetic tape, and the DO position based on the DO position information reproduced from the memory and detects no DO at a position based on the newly detected DO detection signal, it erases the DO position information and the interpolating signal from the memory and performs an ordinary reproduction.

It is also possible to have a configuration such that if the DO position based on the DO position information and the detected DO position agree a specified number of times, the control part 16 decides that the DO was caused by a permanent damage such as defects in the tape and lets the DO detection signal and the interpolating signal remain in the memory.

This configuration allows information in the memory to be used adaptively according to the nature of the DO that has occurred, thus improving the quality of the reproduced image.

As is evident from the foregoing description, because the information used to identify an unreproducible image signal stored in a specified memory of a memory means consisting of different kinds of memories is stored in a memory other than the specified memory, it is possible, during the process of reproducing the image signal from the specified memory, to determine at which locations in the predetermined memory the unreproducible image signal exists.

Further, in this embodiment, because an image signal is constructed for the unreproducible image signal and is stored in a memory other than the specified memory along with the information for identifying the unreproducible image signal contained in the specified memory, it is possible to check at which position in the specified memory the unreproducible image signal exists when the image signal is reproduced from the specified memory. It is also possible to interpolate the unreproducible image signal by using image signals stored in a memory other than the specified memory.

Next, a fourth embodiment of this invention will be described.

Figure 7:
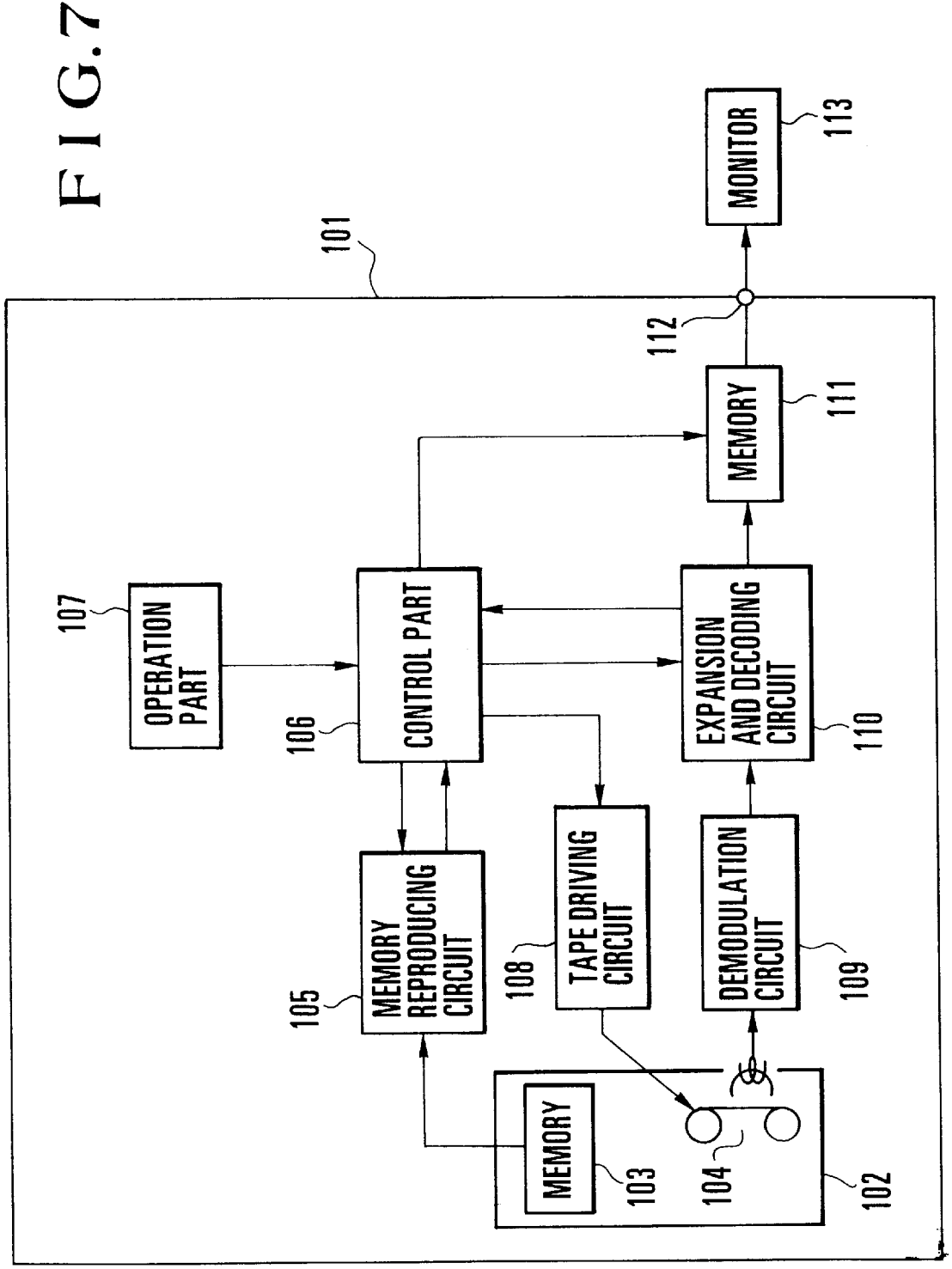
FIG. 7 is a block diagram showing the configuration of a digital VTR as a fourth embodiment of this invention.

FIG. 7 is a block diagram showing the configuration of a digital VTR as the fourth embodiment of this invention. Although FIG. 7 shows only a reproducing system of the digital VTR, the system may also include a recording system as shown in FIG. 1.

Figure 8:
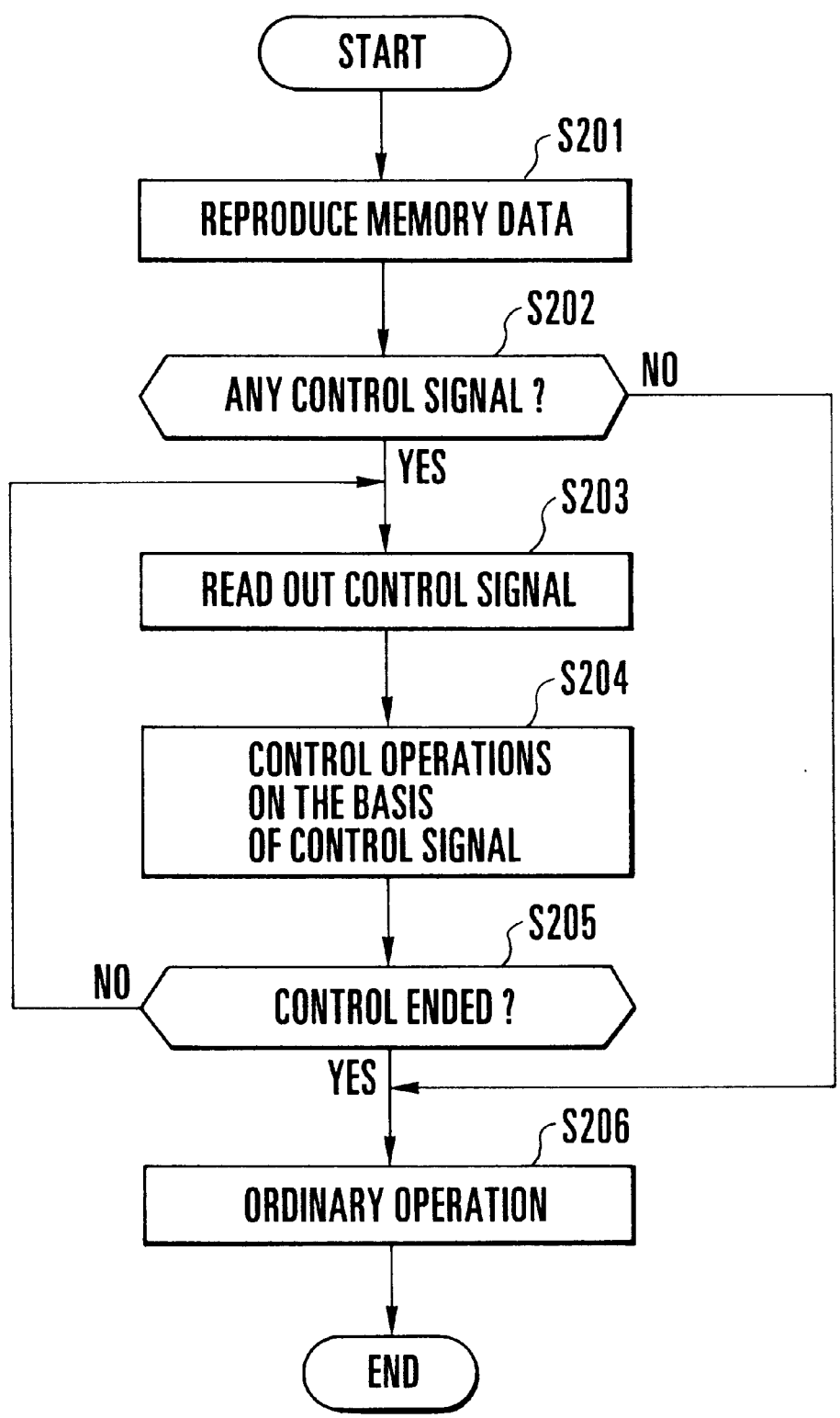
FIG. 8 is a flow chart showing the sequence of operations performed by the apparatus of the fourth embodiment.

The fourth embodiment is explained by referring to the flow chart of FIG. 8.

First, when a cassette 102 is inserted into the VTR 101 and an operation part 107 demands a reproducing operation, a control part 106 outputs a control signal to a memory reproducing circuit 105 to request it to read recorded data from a memory 103 such as a semiconductor memory provided in the cassette 102. The memory reproducing circuit 105, upon reception of the control signal, retrieves memory data recorded in the memory 103 and transfers it to the control part 106 (step S201).

The control part 106 checks if the control signal for controlling the VTR 101 exists in the retrieved memory data and, if it does, reads out the control signal from the memory 103 (step S202, S203). Then the control part 106, based on the control signal thus read out, controls the operation of each circuit as described later (step S204).

If the control signal is not recorded, an ordinary reproducing operation is performed at step S206.

When a series of control operations are completed at step S204, the control part 106 checks if there is any other control signal calling for control operation and, if not, returns to the ordinary operation (step S205, S206). When other control signals are recorded, step S203 is repeated for the above-mentioned operation.

Next, the operation when memory data such as shown in FIG. 9 is recorded in the memory 103 is explained.

FIG. 9 shows a table of memory data recorded in the memory 103, with an area "0" containing data representing the thickness of tape, kind of tape, grade of tape, cassette ID indicating the attribute of the cassette, length of tape and recording time.

An area "1" contains control signals for controlling the operation of the VTR 101. The operation of the VTR 101 is described below according to the sequence of the control signals.

First, when the operation part 107 requests a reproducing operation, the control part 106 controls a tape driving circuit 108 to feed a magnetic tape 104 to reproduce an image signal from the tape 104. At the same time, the control part 106 controls the memory reproducing circuit 105 to read memory data from the memory 103.

The image signal reproduced by the magnetic head from the magnetic tape 104 is subjected to demodulation by a demodulation circuit 109 that corresponds to the modulation performed during the recording operation. The demodulated signal is then transferred to an expansion and decoding circuit 110. In this embodiment, the image signal is compressed and coded through the discrete cosine transformation (DCT), quantization and variable length coding before being recorded in the magnetic tape 104. The expansion and decoding circuit 110 performs on the reproduced image signal the expansion and decoding processing that corresponds to the compression and coding performed during the recording operation, before outputting it to a memory 111. The expansion and decoding circuit 110, in response to the control signal from the control part 106, outputs to the control part 106 a track number representing an absolute position from the start of the tape 104. The track number is recorded in each track formed during the recording operation and represents the recording time from the tape head.

The control part 106 checks the track number from the expansion and decoding circuit 110 and, when the image reproduced from the tape 104 reaches a target image, which is located the t1 time from the start of the tape, writes the image signal that lasts from time t1 to t2 into the memory 111.

After writing the image signal into the memory 111, the control part 106 controls the tape driving circuit 108 to feed the magnetic tape 104 to a position where the image of time t3 is recorded. At the same time, the control part 106 reads out the image signal from the memory 111 and outputs it to a monitor 113 through an output terminal 112. An operator can check the image of time t1 to t2 thus reproduced.

Further, when the reproduced image signal from the magnetic tape 104 reaches the image signal of time t3, the control part 106 performs an ordinary reproduction and writes the image signal of time t3 to t4 into the memory 111. The next control signal allows the control part 106 to rewind the magnetic tape 104 to the position where it was when first inserted and at the same time reads the image signal from the memory 111 and outputs it to the monitor 113 through the output terminal 112.

In FIG. 9, because the memory 103 contains no other control signals than those specifying the above-mentioned sequence of operations, the ordinary reproducing operation is performed after the above sequence of operations are completed. When other control signals are present in the memory, the corresponding control operations are, of course, carried out subsequently.

Although the flow chart of FIG. 8 shows that the ordinary reproducing operation is performed after the control operation is finished, it is also possible to end all operations when the control operation is finished.

Figure 10:
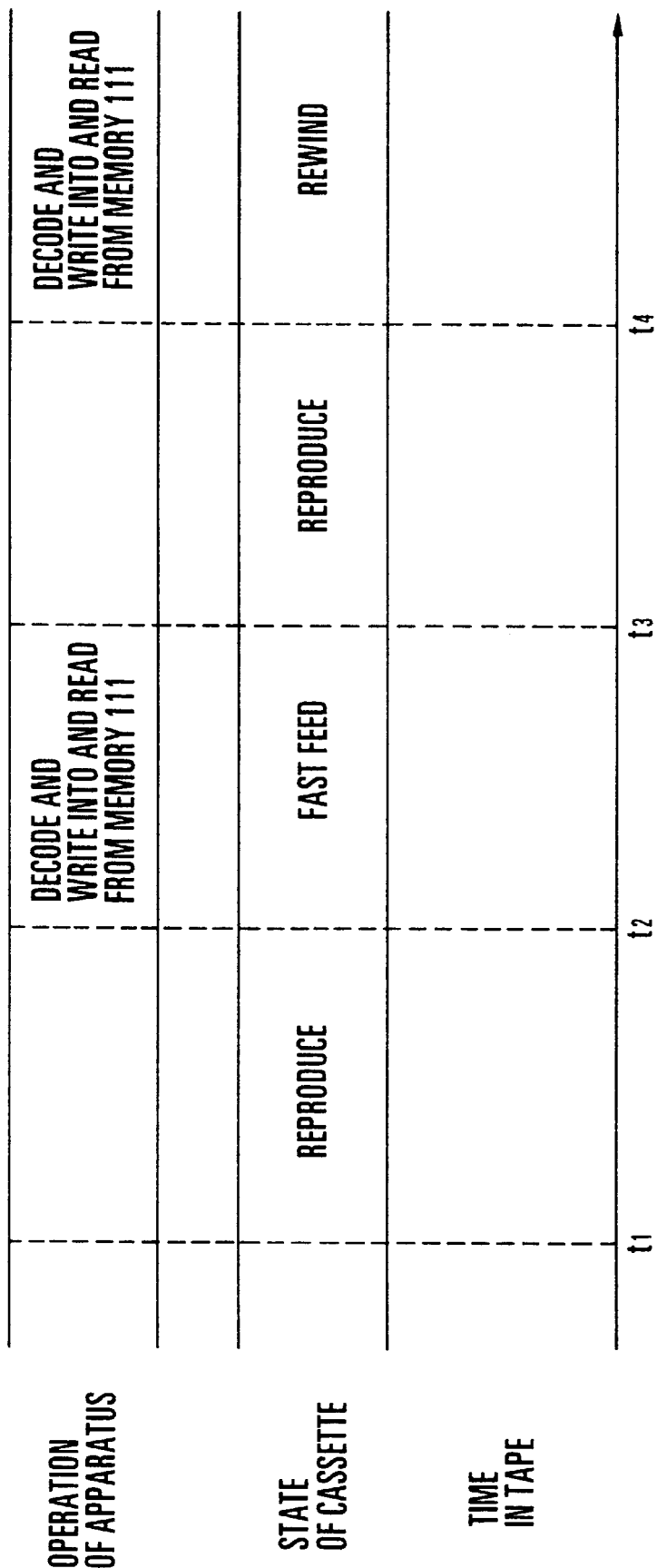
FIG. 10 is a timing chart showing the operation of the apparatus of FIG. 7.

FIG. 10 is a timing chart showing the above-mentioned sequence of operations. As can be seen from FIG. 10, this embodiment performs a search by fast-feeding the tape forwardly while the image signal of time t1 to t2 is being written into and read from the memory 111.

As explained above, because this embodiment records a control signal for controlling the VTR 101 in the memory 103 and, during the reproducing operation, reads out this control signal to perform the control of the VTR 101 according to the control signal, there is no need for the operator to control the VTR at all.

Hence, if a series of operation control programs are stored in the memory incorporated in the cassette whose operation is determined, the operator is not required to make any control.

Figure 11:
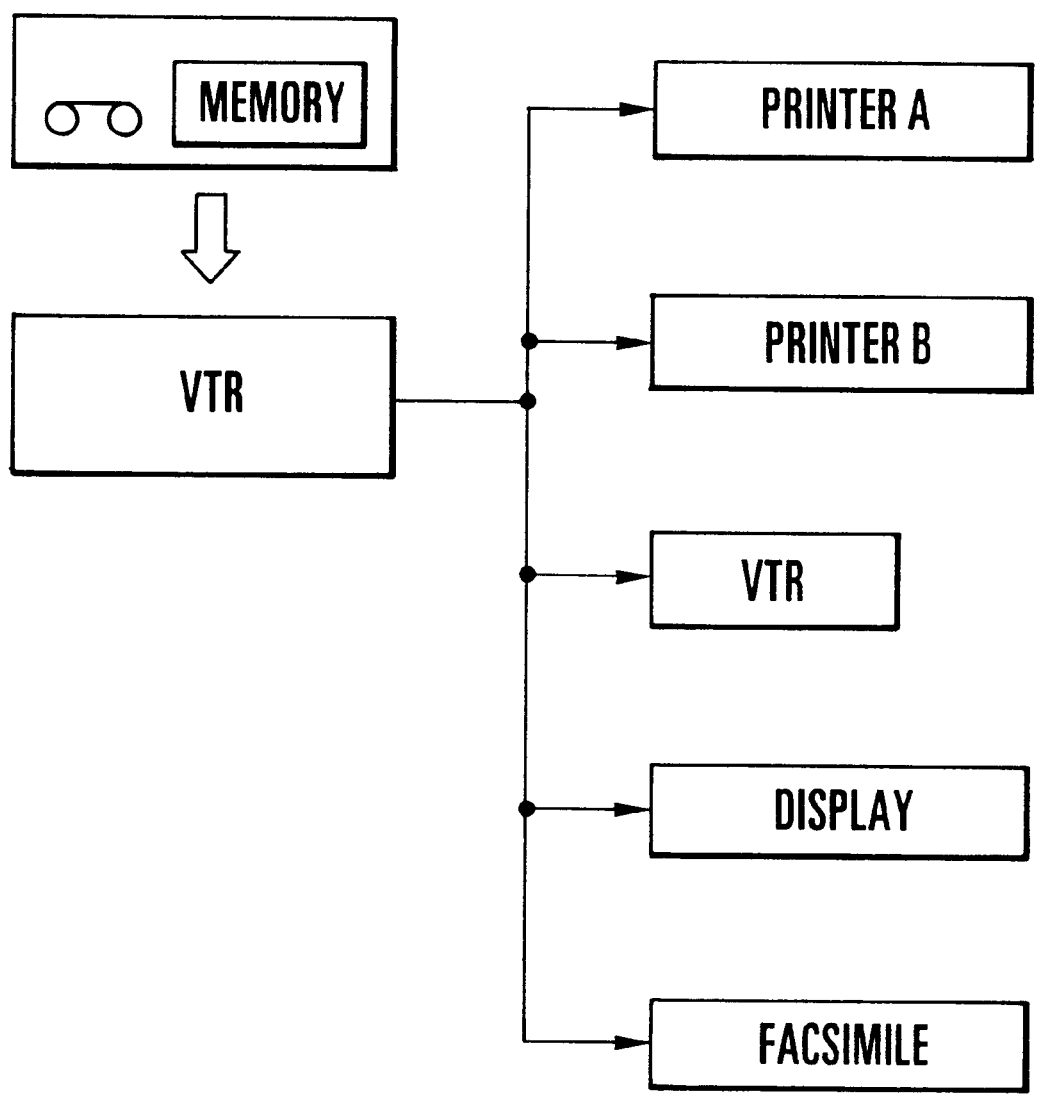
FIG. 11 is a connection diagram showing an example connection between the VTR of the fourth embodiment and external devices.

The above embodiment concerns a case where the operation of an apparatus loaded with a cassette is controlled according to the control signal recorded in the memory. It is possible to connect external devices to the VTR 101 and record in the memory control signals for controlling the operations of the external devices so as to control the operations of these external devices. The connection between the external devices and the VTR 101, which is loaded with a cassette having control signals recorded in its memory, is shown in FIG. 11.

Figure 12:
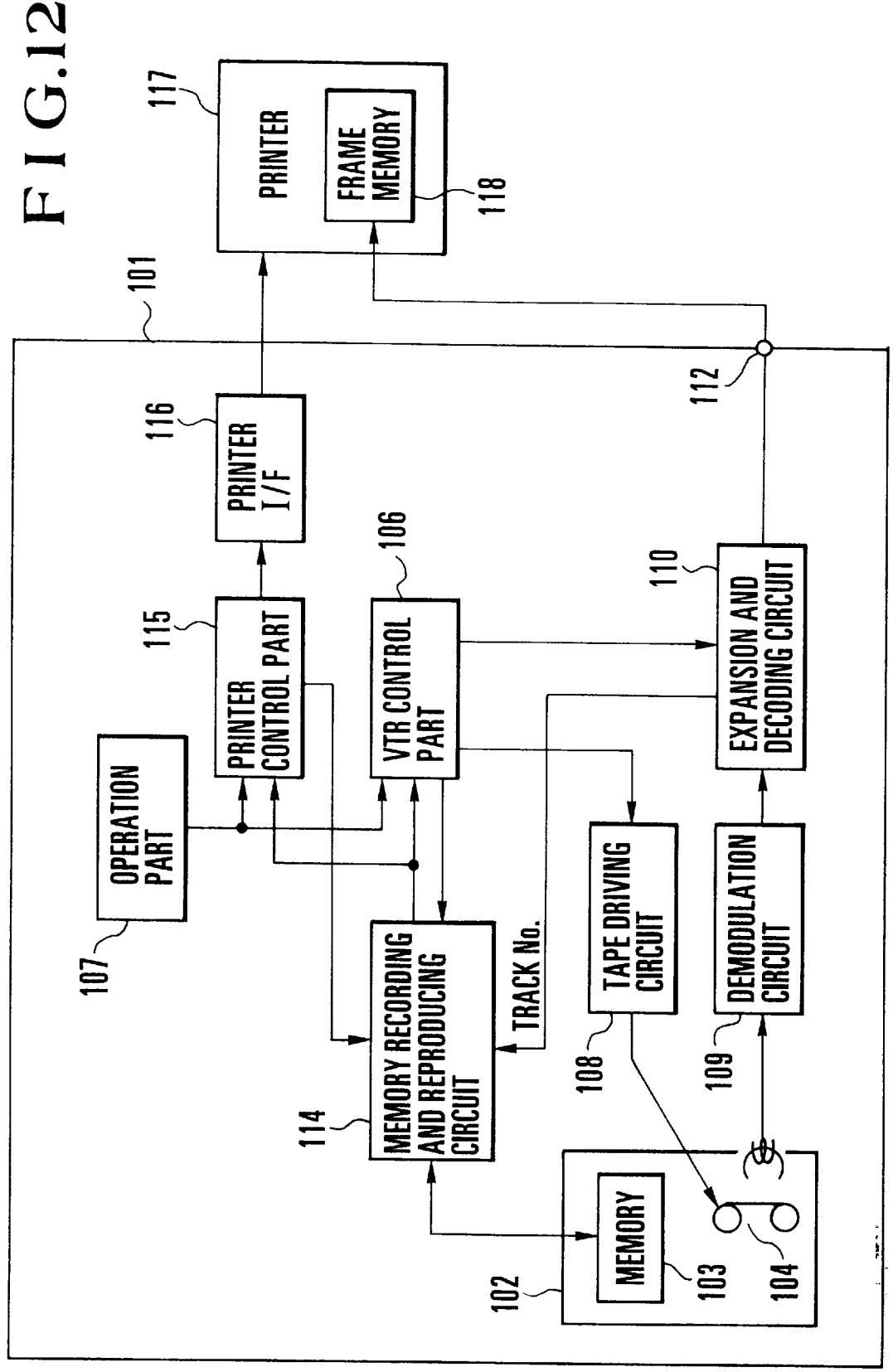
FIG. 12 is a block diagram showing the configuration of a digital VTR as a fifth embodiment of this invention and a printer.

The control operation with a plurality of external devices connected to VTR is described below. FIG. 12 is a block diagram showing the configuration of a digital VTR as a fifth embodiment connected to a printer.

By referring to FIG. 12, the operation of the printer 117 that prints an image signal reproduced from the magnetic tape 104 is explained in the following. Components that perform similar operations to those of the fourth embodiment are assigned like reference numerals and their detailed descriptions are omitted.

First, an operator manipulates the operation part 107 to request an ordinary reproduction to the VTR control part 106 and, when a position on the tape where a desired image to be printed out exists is known, enters a track number for the image. The VTR control part 106, in response to this request, controls the tape driving circuit 108 to transport the magnetic tape 104 at normal speed. As the tape begins to be transported, an image signal is reproduced by the magnetic head from the tape 104 and subjected to the demodulation, expansion and decoding processing, as described earlier. If a track number is entered from the operation part 107, the VTR control part 106 compares the track number of the image being reproduced and the input track number. If they agree, the VTR control part 106 outputs to a frame memory 118 in the printer 117 the image signal for one frame of the track.

If no track number is entered from the operation part 107, the operator checks the reproduced image through a monitor (not shown) and manipulates to output a signal demanding a printout when a desired image appears on the monitor. In response to this control signal, the VTR control part 106 transfers one frame of the image specified by the control signal to the frame memory 118.

Then the operator manipulates the operation part 107 to supply a printer control part 115 with a signal demanding the printout of the image signal written into the frame memory 118. The printer control part 115 outputs the control signal through a printer interface (I/F) 116 to the printer 117, which, according to the control signal, reads the image signal from the frame memory 118 and prints the image on a printing sheet not shown.

Next, the process of printing an image by using a printer control signal recorded in the memory 103 is explained.

The operation of recording a printer control signal in the memory 103 is described first.

After an image signal to be printed is output to the frame memory 118 as described above, the operator outputs a control signal mentioned earlier to the printer control part 115. At the same time, the operator also outputs to the printer control part 115 a print information signal that controls such information as a position on the printing sheet of the image to be printed out, a zoom ratio and a color. The printer control part 115 transfers the print information signal to the printer 117 through the printer I/F 116 and also to a memory recording and reproducing circuit 114, which in turn records the print information signal in the memory 103.

The VTR control part 106 outputs a track number where the image signal to be printed is recorded to the memory recording and reproducing circuit 114, which in turn records the track number into the memory 103.

When the print information signal and the track number are recorded in the memory 103, the VTR control part 106 and the printer control part 115, in response to the control signal from the operation part 107, control the memory recording and reproducing circuit 114 to reproduce from the memory 103 the print information signal and the track number for printout.

Based on the reproduced track number for printout, the VTR control part 106 controls the tape driving circuit 108 to transport the tape 104 to the position where the desired image is recorded and to write the reproduced image into the frame memory 118.

The printer control part 115, according to the reproduced print information signal from the memory 103, regulates the printer 117 to print the image recorded in the frame memory 118.

In this embodiment, as explained above, the image reproduced by the digital VTR 101 is printed with the printer 117 according to the print information signal and the track number for printout recorded in the memory 103 of the cassette 102. It is, therefore, possible to easily reproduce the environment in which the previous printing was performed without requiring the operator to perform any special operations.

Although the memory 103 in this embodiment records the print information signal and the desired track number for printout, it is also possible to record all print operations as control signals in the memory 103 as in the previous embodiment and to perform printing in response to a print start command from the operator. FIG. 13 shows the control signal for controlling the printer operation, recorded in the memory 103.

Further, the print information signal may also include a coefficient of a noise removing digital low-pass filter (LPF) provided in the printer 117. When a still image is derived from a moving image and printed, it is generally possible to generate an image signal to be printed from two succeeding image signals and pass the image through the LPF to minimize noise. That is, by externally entering an optimal coefficient of the digital LPF for removing noise, the noise of the printed image can be removed. With this LPF coefficient stored in the memory 103, an optimum noise eliminating environment can be reproduced.

Further, when a plurality of printers are connected as shown in FIG. 11, it is possible to record conditions of optimal color compression for each printer and to set a desired condition according to a printer ID.

Next, the operation of two digital VTRs connected to each other as a sixth embodiment of this invention will be explained, particularly in the case of dubbing.

Figure 14:
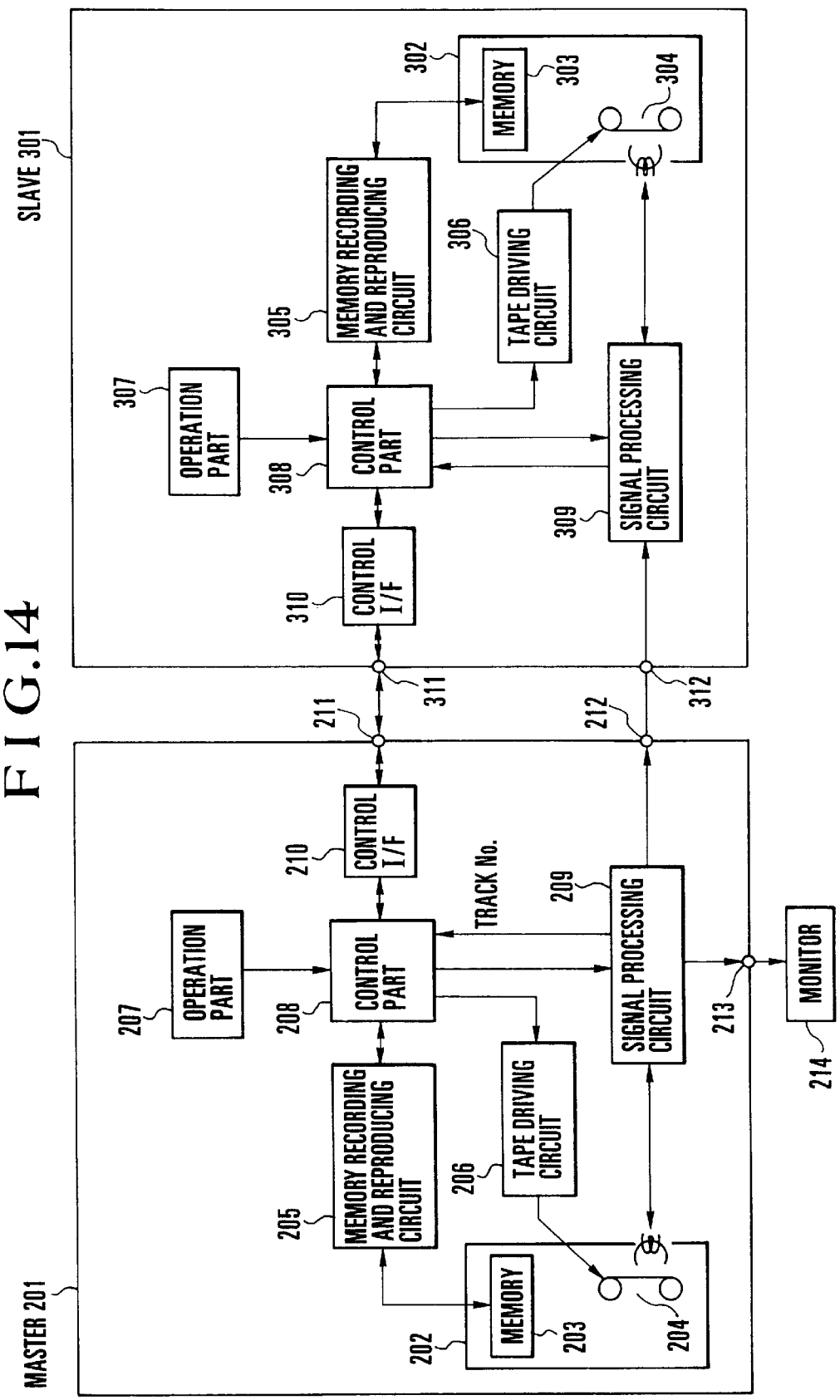
FIG. 14 is a block diagram showing the configuration of a digital VTR as a sixth embodiment of this invention.

FIG. 14 is a block diagram showing the configuration of the sixth embodiment when dubbing is performed using the two digital VTRs.

First, the operation when no control signal is recorded in the memory 203 of the cassette 202 is described.

In the ordinary reproducing operation, when an operator issues a demand for ordinary reproduction from the operation part 207, a control part 208, in response to the control signal, outputs a control signal to a tape driving circuit 206 to drive the tape 204 at a normal speed. Then, the magnetic head reproduces an image signal recorded in the tape 204 and outputs it to a signal processing circuit 209. The control part 208 controls the signal processing circuit 209 to perform a specified processing on the reproduced image signal. The digital VTR of this embodiment, like the previous embodiments, compresses and codes the image signal before recording it and therefore the signal processing circuit 209 expands and decodes the reproduced image signal. In other words, the signal processing circuit 209 performes the reverse operations of quantization and DCT.

After the above processing, the signal processing circuit 209 outputs the image signal to output terminals 212, 213. The output terminal 212 is used for dubbing, whose operation is described later. The image associated with the image signal output from the output terminal 213 is displayed on a monitor 214 so that the operator can see it.

Next, the dubbing operation when no control signal is recorded in the memory 203 is explained.

The operator first issues a recording standby command from an operation part 307 of a slave VTR 301 to set the VTR 301 on standby for recording. From an operation part 207 of a master VTR 201, the operator issues a command for normal reproduction as mentioned above and checks the reproduced image on a monitor 214. When a desired image that one wants dubbed appears, a record start command is issued from the operation part 307 of the VTR 301.

Upon reception of the record start command from the operation part 307, a control part 308 outputs a control signal to the tape driving circuit 306 to drive the tape 304 at a normal speed. The control part 308 also issues a command to a signal processing circuit 309 to perform compression and coding on the image signal entered from an input terminal 312. The compression and coding processing uses DCT, quantization and variable length coding. The image signal compressed and coded by the signal processing circuit 309 is recorded on the tape 304 by the magnetic head.

When the reproduction of a part of the image signal being dubbed is finished, the operator issues a recording stop command from the operation part 307 of the VTR 301 and also a reproduction stop command from the operation part 207 of the VTR 201, thus terminating the dubbing.

Figure 16:
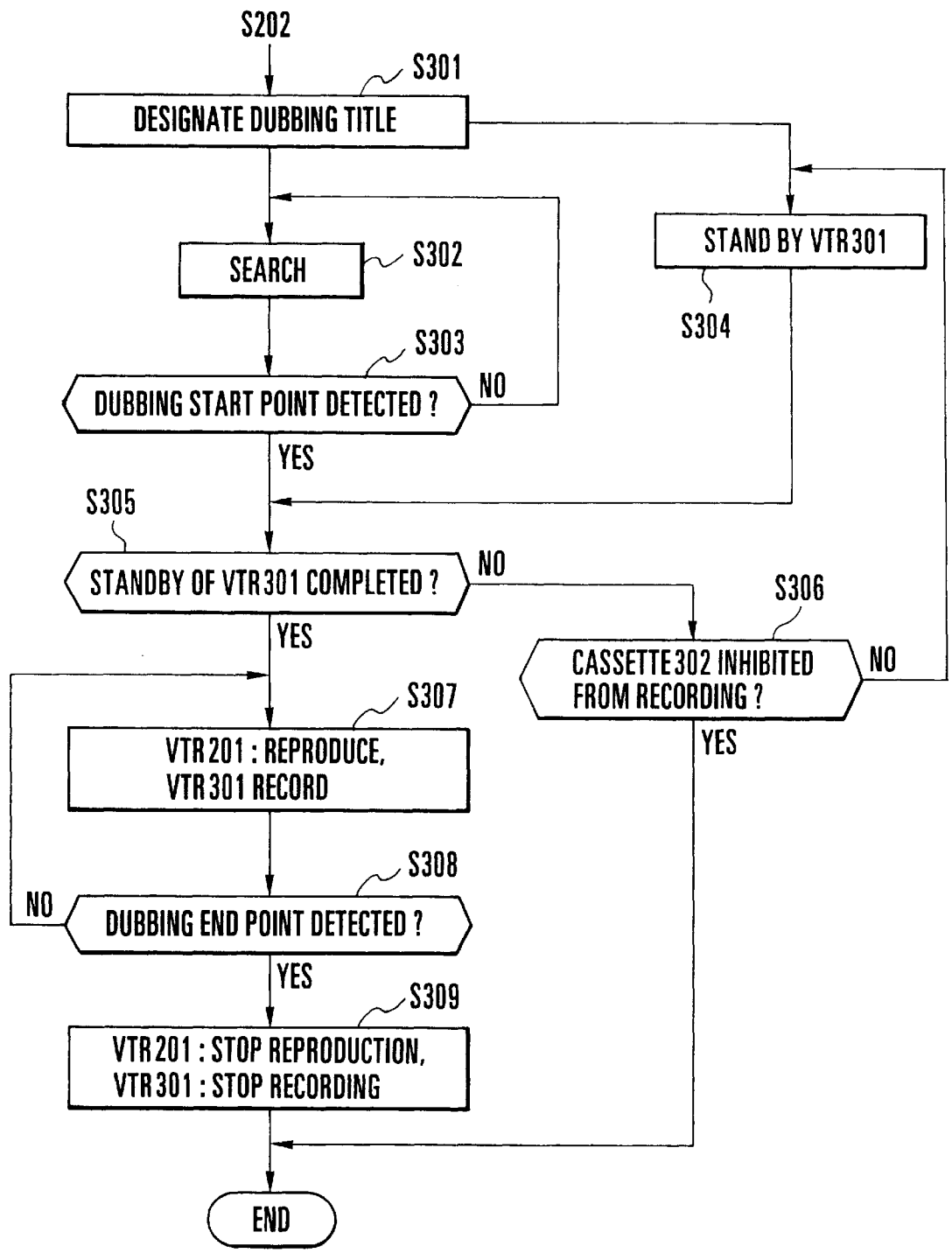
FIG. 16 is a flow chart showing the sequence of operations performed by the apparatus of FIG. 14.

Next, the control operation performed when dubbing control data as shown in FIG. 15 is recorded in the memory 203 is described by referring to the flow chart of FIG. 16. The flow of FIG. 16 starts after the step S202 of FIG. 8.

FIG. 15 shows memory data stored in the memory 203. A space "0" stores a thickness of tape, a kind of tape, a grade of tape, a cassette ID representing the attribute of the cassette, a length of tape and a recording time. A space "1" stores control signals for controlling the dubbing operation. In FIG. 15, VTR M represents a master VTR and VTR S represents a slave VTR. In this embodiment, they are VTR 201 and VTR 301, respectively.

As described earlier, when the operation part 207 specifies a title of an image to be dubbed and requests a reproduction (step S301), the control part 208 controls the tape driving circuit 206 to drive the tape at a speed higher than the normal speed (step S302). Then, the signal processing circuit 209 performs the above-mentioned processing on the reproduced image signal. At this time, the signal processing circuit 209 outputs a track number along with the reproduced image signal to the control part 208, which, based on this track number, detects a dubbing start point (a title name in this embodiment) specified by the operation part 207 (step S303) and sets the VTR in a reproduction standby state.

In parallel with these operations, the control part 208 outputs a control signal through a control I/F 210, a terminal 211 and a terminal 311 on the side of the VTR 301. The control part 308 of the VTR 301, in response to the control signal entered through the terminal 311 and the control I/F 310, sets the VTR 301 on standby for recording and at the same time tells the signal processing circuit 309 to perform processing in synchronism with the image signal entered from the outside. Then after these operations are finished, the control part 308 outputs a standby completion signal to the VTR 201 through the control I/F 310 and the terminal 211.

Then, at step S305, the control part 208 checks whether the standby of VTR 301 is completed and, if so, proceeds to step S307. When the standby is not complete, the control part 208 moves to step S306.

When a memory 303 of the cassette 302 loaded in the VTR 301 is recorded with data that prohibits recording, this data is reproduced by a memory recording and reproducing circuit 305 and the control part 308 does not set the VTR 301 on stanby for recording. In this case, the control part 308 at step S306 outputs a recording prohibit signal to the VTR 201 before terminating its operation.

Upon receiving a standby completion signal from the VTR 301, the control part 208 of the VTR 201 controls the VTR 201 to perform the ordinary reproducing operation as described earlier and at the same time outputs a control signal for synchronizing the VTR 301 with the VTR 201.

Then, when the VTR 201 starts reproducing an image signal from the tape 204, the control part 208 outputs a control signal for resetting the recording standby to the VTR 301. The control part 308 of the VTR 301, upon receiving this control signal, records the image signal entered from the input terminal 312 onto the tape 304 as described before (step S307).

When, after the dubbing has been performed for a specified time, the control part 208 of the VTR 201 detects a dubbing end point specified by the operation part 207 (step S308), the control part 208 stops the reproducing operation of the VTR 201 and outputs a control signal to the VTR 301 to change the VTR mode from the recording standby to the stop.

Upon reception of the recording standby-to-stop mode change control signal, the control part 308 of the VTR 301 changes the mode of the VTR 301 from the recording standby to the stop, thus stopping all the dubbing operations (step S309).

In this way, because this embodiment performs dubbing according to the control signal recorded in the memory of the reproducing side cassette, the operator needs only to load a reproducing and recording cassette and request a dubbing to the master VTR. This automatically starts the dubbing operation.

This embodiment concerns a case of dubbing. When an editing is done using two VTRs, what an operator needs to do is only to insert a recording standby command for the VTR 301 between the dubbing works, as in a seventh embodiment shown in FIG. 17.

Next, an editing work is described in the seventh embodiment of this invention.

Figure 19:
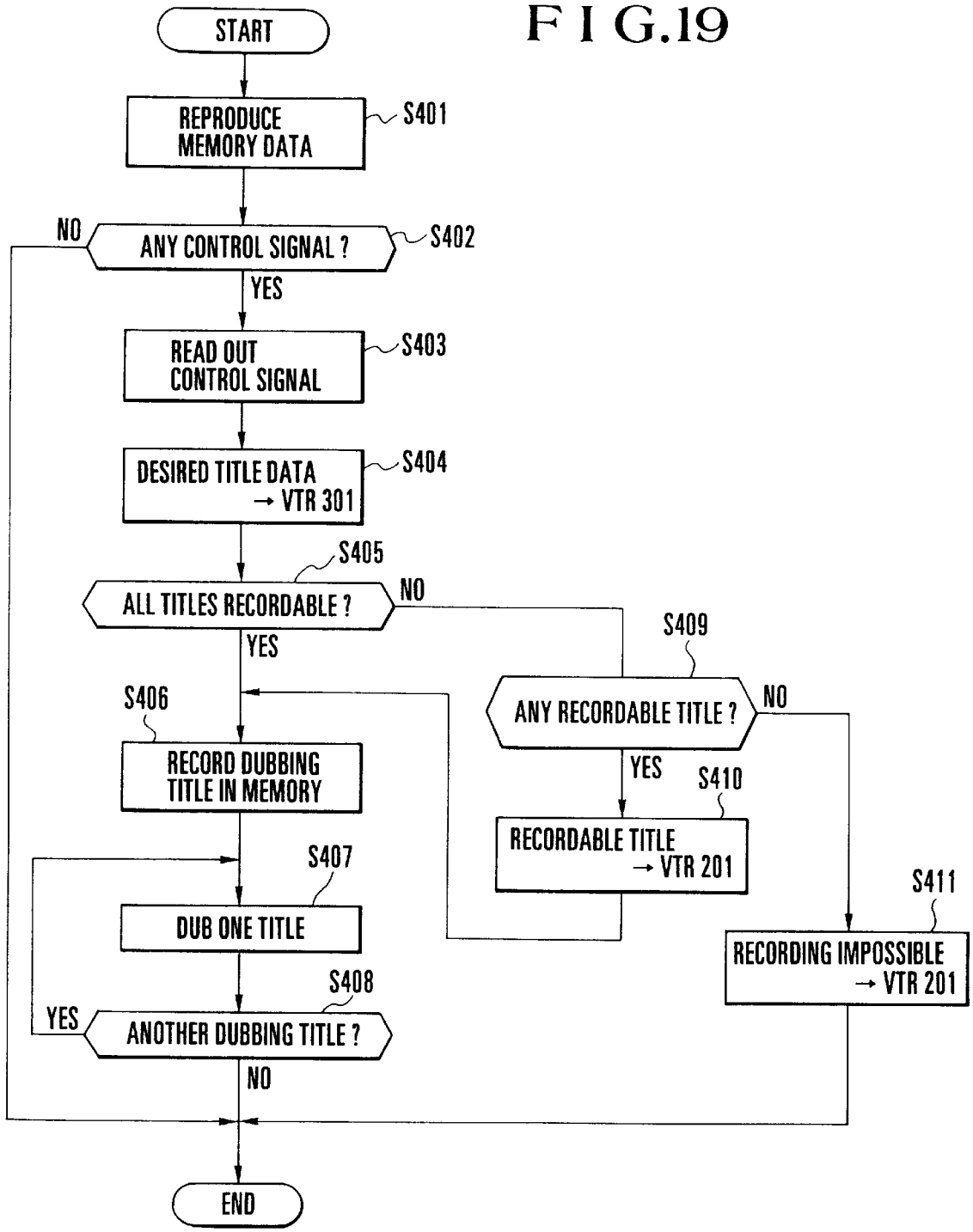
FIG. 19 is a flow chart showing the sequence of operations performed by the apparatus of the seventh embodiment.

In this embodiment, a space "0" of memory 203, 303 in the cassette 202, 302 stores titles of the recorded images and their recording times as well as physical data such as the thickness of tape, as shown in FIG. 18. The process of editing and recording an image signal of a specified title recorded in the master cassette 202 onto the cassette 302 by the VTR 301 is explained by referring to the flow chart of FIG. 19.

When the operation part 207 of the VTR 201 specifies a reproduction (editing) as described above, the control part 208 reads data from the memory 203 by the memory recording and reproducing circuit 205 (step S401). When a control signal is present in the memory 203, it is read out. When no control signal is present, an ordinary reproducing operation is carried out (step S402, S403). This embodiment has data as shown in FIG. 18 recorded in the memory 203, and a space "1" stores a remaining tape length of the cassette 202, control signals for editing, and titles of image signals that an operator wants to edit. The control signals are similar to those for a series of edit operations shown in FIG. 17. The control part 208 picks up desired titles from these data for editing and outputs it to the VTR 301 (step S404).

The control part 308 that has received the titles from the VTR 201 retrieves the remaining tape length data from the memory 303 by the memory recording and reproducing circuit 305 and compares the remaining tape length data with the recording times received along with the titles (step S405). When all the titles are found to be recordable, the control part 308 records the titles to be edited and their recording times into the space "0" of the memory 303 by the memory recording and reproducing circuit 305 (step S406).

When the control part 308 detects that the remaining tape length of the cassette 302 is not long enough to record all the selected titles for editing, it checks if a part of the titles can be recorded or not and records only the recordable titles into the memory 303 (step S409, S406). The control part 308 outputs the data of the recordable titles to the VTR 201 (step S410). If no titles can be recorded, this is notified to the VTR 201 before the control operation is terminated (step S411).

Then, after the VTR 301 is set on standby for recording, the standby completion signal is sent to the VTR 201.

The control part 208 that has received the standby completion signal searches for a title recorded in the cassette 302 and dubs a title-1 to the cassette 302 (step S407). Then, when the dubbing of the image signal of the title-1 is finished, the control part 208 outputs a recording standby control signal to the VTR 301 and checks if there is any title to be dubbed (step S408). In this case, there is a title-2 and thus the control part 208 searches for the title-2.

The control part 208, when it detects the image signal of the title-2, dubs the title-2 image signal in the similar manner. In this embodiment because there is no further title to be dubbed, the control part 208 checks and stops all the operations.

As explained above, this embodiment, too, can perform automatic editing according to the edit control signal recorded in the memory 203 of the reproducing side cassette and to the data of desired titles for editing.

In the above embodiment, the control signals recorded in memory are those for dubbing and editing. When the order of titles to be reproduced is already determined, it is possible to store a control signal for a normal reproducing operation in memory and to perform the reproducing operation based on the control signal.

If none of the titles picked up for dubbing is found recordable, this may be displayed for the operator to select a further title for dubbing.

As can be seen from the foregoing description, because a memory means stores a control signal for controlling the operation of the apparatus and external reproducing apparatuses along with an information signal, it is possible to reproduce the control signal and automatically control the operation of a plurality of apparatuses according to this control signal.

Further, because the control signal and the information signal, both stored in the memory means, are reproduced, it is possible to control the operation of a plurality of apparatuses automatically according to the control signal.

When the VTR and external devices are connected as shown in FIG. 11, control signals for individual external devices as shown in FIG. 20 may be stored in memory and the ID signals of the external devices may be received so that the control signals can be selected automatically according to the ID signals. This configuration permits automatic control of each of the externally connected devices.

The memory 8 of FIG. 1, 4 and 6 stores only DO position information and interpolating image signals. It is also possible to store the control signals of FIG. 9 in memory and to control the operation of the apparatus and the external apparatus according to the stored control signals, as in the previous embodiment.

Similarly, the memory 103, 203, 303 of FIG. 7, 12 and 14 may store the DO position information and the processing may be performed using this DO position information during the reproducing operation.

What is claimed is:

1. A reproducing apparatus, comprising:
    (a) reproducing means for reproducing a digital information signal and a control signal relating to the digital information signal from a memory device formed of different kinds of memory means contained in a same housing,
        the plurality of kinds of memory means including first memory means storing the digital information signal and second memory means storing the control signal,
        said reproducing means reproducing the digital information signal from said first memory means and reproducing the control signal from said second memory means;
    (b) output means for outputting the reproduced digital information signal to a recording device which receives the digital information signal output from said output means and records the digital information signal; and
    (c) control means for controlling a recording operation of the recording device according to the control signal reproduced by said reproducing means.

2. An apparatus according to claim 1, further including an external device having input means for receiving the reproduced digital information signal output from the input means, and further recording means for recording the reproduced digital information signal onto a second memory device formed of different kinds of memory means contained in a same housing, wherein the control signal includes a signal to control a recording operation of the further recording means.

3. An apparatus according to claim 1, wherein said control means controls the recording device so that the recording device starts recording the digital information signal output from said output means according to a start of reproducing the digital information signal by said reproducing means.

4. An apparatus according to claim 1, wherein said control means controls the recording device so that the recording device stops recording the digital information signal output from said output means according to a stop of reproducing of the digital information signal by said reproducing means.

5. An apparatus according to claim 1, wherein said reproducing means comprises processing means for decoding the digital information signal, said output means outputting the decoded digital information signal.

6. An apparatus according to claim 1, wherein said second memory means has a plurality of memory areas including a first memory area and a second memory area, the first memory area storing information relating to the first memory means and the second memory area storing the control signal.

7. An apparatus according to claim 1, wherein the digital information signal comprises a digital video signal having a plurality of titles, said reproducing means selectively reproducing the plurality of titles of the digital video signal.

8. An apparatus according to claim 1, wherein said first memory means comprises a magnetic tape and said second memory means comprises a semiconductor memory.

9. A digital video cassette recorder for reproducing a digital image signal from a cassette which contains a tape and a semiconductor memory, comprising:
   (a) first reproducing means for reproducing a digital image signal from the tape, said first reproducing means including a drive circuit for driving the tape;
   (b) second reproducing means for reproducing a digital control signal relating to the digital image signal recorded on the tape, the digital control signal including a signal for controlling a reproduction operation of the digital image signal from the tape by said first reproducing means; and
   (c) control means for controlling the reproduction operation of the digital image signal from the tape by said first reproducing means,
   said cassette being separable from said recorder,
   said control means controlling said drive circuit to automatically control a driving speed of the tape according to the digital control signal reproduced by said second reproducing means.

10. A digital video cassette recorder according to claim 9, wherein said first reproducing means includes head means for tracing the tape to reproduce the digital image signal, and error correcting means for correcting errors in the digital image signal reproduced by said head means, said control means controlling an error correcting operation of said error correcting means according to the digital control signal.

11. A reproducing apparatus, comprising:
   (a) reproducing means for reproducing a first information signal from memory means and a second information signal from a different kind of memory means contained in a same housing; and
   (b) signal outputting means for providing a reproducing apparatus output signal by using a reproducible portion of said reproduced first information signal and a third information signal obtained by use of said second information signal, wherein said second information signal is indicative of a time period of said first information signal in which said first information signal is not reproducible and wherein said housing is separable from said apparatus.

12. A reproducing apparatus according to claim 11, wherein said third information signal occupies a time slot in said reproducing apparatus output signal corresponding to said time period.

13. A reproducing apparatus according to claim 11, further including interpolation circuitry which generates said third information signal responsively to said second information signal.

14. A reproducing apparatus, comprising:
   reproducing means for reproducing a digital information signal and a control signal relating to the digital information signal from a memory device formed of different kinds of memory means contained in a same housing,
   the plurality of kinds of memory means including first memory means storing the digital information signal and second memory means storing the control signal,
   the control signal including a signal for controlling a reproduction operation of the digital information signal from said first memory means by said reproducing means,
   said reproducing means including driving means for driving said first memory means; and
   control means for controlling the reproduction operation of the digital information signal from said first memory means by said reproducing means,
   said memory device being separable from said recorder,
   said control means controlling said driving means to automatically control a driving speed of the tape according to the control signal reproduced by said reproducing means.

15. An apparatus according to claim 14, wherein said reproducing means comprises processing means for decoding the digital information signal.

16. An apparatus according to claim 14, wherein said second memory means has a plurality of memory areas including a first memory area and a second memory area, the first memory area storing information relating to the first memory means and the second memory area storing the control signal.

17. An apparatus according to claim 14, wherein said first memory means comprises a magnetic tape and said second memory means comprises a semiconductor memory.

* * * * *

UNITED STATES PATENT AND TRADEMARK OFFICE
CERTIFICATE OF CORRECTION

PATENT NO. : 6,034,828
DATED : March 7, 2000
INVENTOR(S) : Akiyoshi Hamanaka, et al.

It is certified that error appears in the above-indentified patent and that said Letters Patent is hereby corrected as shown below:

Face page, [54], delete "RECORDING OF REPRODUCING APPARATUS" and insert -- AN APPARATUS FOR RECORDING AND REPRODUCTION ON AND FROM A MEMORY DEVICE HAVING A PLURALITY KINDS OF MEMORIES INTEGRATED THEREWITH --.

Signed and Sealed this

Seventeenth Day of April, 2001

*Attest:*

NICHOLAS P. GODICI

*Attesting Officer*          *Acting Director of the United States Patent and Trademark Office*